3,361,825
NOVEL 15-KETO-B-NORSTEROIDS
Kenneth G. Holden, Stratford, N.J., assignor to Smith Kline & French Laboratories, Philadelphia, Pa., a corporation of Pennsylvania
No Drawing. Filed June 2, 1966, Ser. No. 555,213
6 Claims. (Cl. 260—586)

This application is a continuation-in-part of copending application Ser. No. 350,667, filed Mar. 10, 1964, now abandoned.

This invention relates to novel B-norsteroids having utility as pharmacodynamic agents and as chemical intermediates. More specifically, the compounds of this invention have effects on the endocrine function, such as antiandrogenic activity, and on the central nervous system, such as depressant or sedative activity.

The B-nor compounds of this invention are distinguished by three basic structures, as follows:

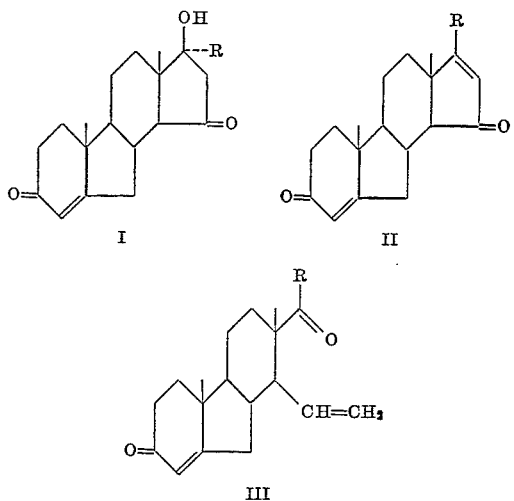

in which R is a lower alkyl, such as methyl or ethyl.

The compounds of this invention are prepared from 15α-hydroxy-B-nor-17α-alkyltestosterones by oxidation in the case of compounds of Formula I, oxidation and dehydration for compounds of Formula II, and by treatment with an alkali metal alkoxide in the case of compounds of Formula III. The 15α-hydroxy starting materials are prepared by biotransformation of the B-nortestosterone congener using *Aspergillus ochraceus* ATCC 12337 or *Trichothecium roseum* ATCC 12543.

15-keto-17α-alkyl-B-nortestosterones (I) are prepared by oxidation of the 15-hydroxy starting material using standard chromic acid solution in acetone in the cold. These compounds have appreciable antiandrogenic activity.

The 15-keto congeners (I) are also useful intermediates. Treatment of I with acid, such as p-toluene sulfonic acid in an inert solvent such as benzene, most conveniently at reflux for from one to five hours, gives, by dehydration, a 17-alkyl-B-norandrosta-4,16-diene-3,15-dione (II), which compounds have sedative activity.

The 16,17-seco congeners (III) are prepared by acylation of the 15α-hydroxy starting material using tosyl chloride in pyridine overnight at room temperature to form the 15-O-acylate. This compound is decomposed by treatment with potassium tert-butoxide in a suitable solvent such as benzene at reflux for twelve to twenty-four hours to give the desired 17-alkyl-16,17-seco-B-norandrosta-4,15-diene-3,17-dione (III). These compounds are antiandrogenic agents.

It will be obvious to one skilled in the art that certain modifications of this invention, especially those not involving the D-ring, are possible. The following examples are to illustrate this invention but are not designed to limit the scope of the material claimed.

Example 1

The fermentation medium is comprised of 20 g. of commercial enzymatic digest of lactalbumin (Edamine, Sheffield Co.), 50 g. of commercial dextrose (Cerelose, Corn Products), 5 g. of corn steep liquors and water to make one liter. Ten liters of medium is prepared, adjusted to pH 6.3–6.5 with sodium hydroxide solution and autoclaved for 1½ hours at 15 p.s.i. at 121°.

The fermentation reaction is carried out in 10 liter stir jars of New Brunswick Fermentation Units with a water bath temperature of 28–30°, with aeration rate of 1 liter of air per minute per liter stirred at an impeller speed of 200 r.p.m. with a standard antifoam agent added.

The inoculum is prepared by using 100 ml. of the medium in 500 ml. Erlenmeyer flasks on a rotary shaker at 200 r.p.m., ambient temperature, using *Aspergillus ochraceus* ATCC 12337. 200 ml. of inoculum is used per 10 l. fermentation.

A substrate solution of 17α-methyl-B-nortestosterone in 95% ethanol, 1 g. per 16 ml., is prepared. After 48 hours, growth substrate solution containing 1 g. of substrate is pumped in below the surface of the liquid medium at 4 hour intervals until 10 g. of substrate is used. The formation of the product is periodically followed using thin layer chromatography with an ethyl acetate solvent system. The fermentation is terminated six hours after the last substrate addition.

The cells are removed by filtration through muslin, then extracted with a 1:1 95% ethanol-methylene chloride mixture. After filtration, the extracts are combined with the clarified broth, which is then extracted with methylene chloride. The dried organic extracts are evaporated to dryness in vacuo at 50°.

Crystallization of the residue from methylene chloride-methanol gives 57% of 15α-hydroxy-17α-methyl-B-nortestosterone, M.P. 243–249°.

Example 2

A solution of 9 g. of 15α-hydroxy-17α-methyl-B-nortestosterone in 1700 ml. of acetone is mixed with 21 ml. of standard chromic acid solution at 0°. The mixture is quenched in ice water. Extraction with methylene chloride gives a crude product which is crystallized from acetone-hexane to give 15-keto-17α-methyl-B-nortestosterone, M.P. 211–213°.

Example 3

A solution of 5.03 g. of 15-keto-17α-methyl-B-nortestosterone in 500 ml. of benzene containing 1 g. of p-toluenesulfonic acid is heated at reflux for three hours. The cooled solution is washed with sodium bicarbonate solution, dried and concentrated. The resulting solution is chromatographed on an alumina column (80 g., Woelm, III). The material eluted with benzene and methylene chloride is recrystallized from acetone-hexane to give 17-methyl-B-norandrosta-4,16-diene-3,15-dione, M.P. 131–132°.

Example 4

A solution of 1 g. of 15α-tosyloxy-17α-methyl-B-nortestosterone in 100 ml. of benzene containing 2.35 ml. of 1.02 molar potassium tert-butoxide in tert-butanol is heated at reflux for sixteen hours. The cooled reaction mixture is washed with water, dried and evaporated. The crude residue is purified by passing its solution over a 15 g. column of alumina (Woelm, III) with elution by benzene, then recrystallized from acetone-hexane to give 17-methyl - 16,17 - seco-B-norandrosta-4,15-dien-3,17-dione, M.P. 75–77°.

The reactions illustrated by Examples 1 through 4 are repeated identically, using the known 17α-ethyl-B-nor-testosterones to give the corresponding 17-ethyl congeners.

What is claimed is:

1. A compound of the formula

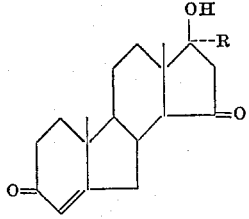

where R is selected from the group consisting of methyl and ethyl.

2. A compound of the formula

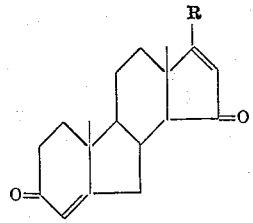

where R is selected from the group consisting of methyl and ethyl.

3. A compound of the formula

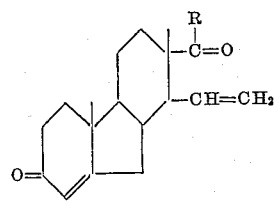

where R is selected from the group consisting of methyl and ethyl.

4. A compound as claimed in claim 1, being the compound 15-keto-17α-methyl-B-nortestosterone.

5. A compound as claimed in claim 1, being the compound 17-methyl-B-norandrosta-4,16-diene-3,15-dione.

6. A compound as claimed in claim 1, being the compound 17 - methyl-16,17-seco-B-norandrosta-4,15-diene-3,17-dione.

References Cited

UNITED STATES PATENTS 3,072,681   1/1963   Kerwin _____ 260—586

LEON ZITVER, *Primary Examiner.*

M. JACOB, *Assistant Examiner.*